(12) United States Patent
Schumann et al.

(10) Patent No.: US 12,431,716 B2
(45) Date of Patent: Sep. 30, 2025

(54) SYSTEM NETWORK COMPRISING AT LEAST TWO ELECTROLYSIS SYSTEMS AND A POWER SUPPLY SOURCE

(71) Applicant: Siemens Energy Global GmbH & Co. KG, Munich (DE)

(72) Inventors: Sven Schumann, Wilhermsdorf (DE); Marvin Bendig, Zirndorf (DE); Ulf-Andre Geck, Herzogenaurach (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/872,964

(22) PCT Filed: May 29, 2023

(86) PCT No.: PCT/EP2023/064313
§ 371 (c)(1),
(2) Date: Dec. 9, 2024

(87) PCT Pub. No.: WO2023/237372
PCT Pub. Date: Dec. 14, 2023

(65) Prior Publication Data
US 2025/0266688 A1    Aug. 21, 2025

(30) Foreign Application Priority Data
Jun. 8, 2022  (DE) .................. 10 2022 205 818.6

(51) Int. Cl.
*H02J 3/46* (2006.01)
*H02K 7/18* (2006.01)

(52) U.S. Cl.
CPC ............... *H02J 3/46* (2013.01); *H02K 7/183* (2013.01)

(58) Field of Classification Search
CPC .................................. H02J 3/46; H02K 7/183
See application file for complete search history.

(56) References Cited

U.S. PATENT DOCUMENTS

| | | | |
|---|---|---|---|
| 9,249,518 | B2 | 2/2016 | Hinatsu et al. |
| 11,005,270 | B2 | 5/2021 | Falk et al. |
| 11,848,602 | B2 | 12/2023 | Utz |
| 2014/0021785 | A1 | 1/2014 | Munier et al. |
| 2023/0212765 | A1 | 7/2023 | Jiang et al. |

(Continued)

FOREIGN PATENT DOCUMENTS

| | | |
|---|---|---|
| CN | 114362215 A | 4/2022 |
| DE | 102017114306 A1 | 1/2019 |
| EP | 3723254 A1 | 10/2020 |

(Continued)

*Primary Examiner* — Tulsidas C Patel
*Assistant Examiner* — Thomas K Quigley
(74) *Attorney, Agent, or Firm* — Laurence A. Greenberg; Werner H. Stemer; Ralph E. Locher

(57) ABSTRACT

A system network includes at least two electrolysis systems, a power supply source, and a central supply line. The central supply line is connected to the secondary side of a transformer. The primary side of the transformer can be fed with energy from the power supply source. The transformer is designed for an operating frequency above the mains frequency of the public power grid, and so a higher-frequency AC grid is formed, to which the electrolysis systems are connected via the central supply line.

13 Claims, 3 Drawing Sheets

(56) References Cited

U.S. PATENT DOCUMENTS

2025/0266688 A1     8/2025    Schumann et al.

FOREIGN PATENT DOCUMENTS

| | | |
|---|---:|---:|
| EP | 3965249 A1 | 3/2022 |
| WO | WO 2013164018 A1 | 11/2013 |
| WO | WO-2021219176 A1 * | 11/2021 |
| WO | WO 2023213446 A1 | 11/2023 |
| WO | 2023237372 A1 | 12/2023 |

\* cited by examiner

SYSTEM NETWORK COMPRISING AT LEAST TWO ELECTROLYSIS SYSTEMS AND A POWER SUPPLY SOURCE

FIELD AND BACKGROUND OF THE INVENTION

The invention relates to a plant network comprising at least two electrolysis plants and a power supply source. The invention furthermore relates to a use.

An electrolysis plant is an apparatus which brings about a conversion of substances with the aid of electrical current (electrolysis). In accordance with the variety of different electrochemical electrolysis processes, there are also a multiplicity of electrolysis plants, for example an electrolysis plant for water electrolysis.

Hydrogen is nowadays produced, for example, from water by means of proton exchange membrane (PEM) electrolysis, an anion exchange membrane or alkaline electrolysis. The electrolysis plants produce hydrogen and oxygen from the supplied water with the aid of electrical energy. This process takes place in an electrolysis stack composed of a plurality of electrolysis cells. In the electrolysis stack which is under a DC voltage, water is introduced as the educt, wherein, after passing through the electrolysis cells, two fluid flows consisting of water and gas bubbles ($O_2$ or $H_2$) emerge.

Current considerations include producing valuable substances using excess energy from renewable energy sources in times when there is a lot of sun and a lot of wind, that is to say above-average solar power or wind power production. A valuable substance may be, in particular, hydrogen which is produced by water electrolysis plants. So-called renewable energy gas—also referred to as RE gas—can be produced on the basis of hydrogen, for example. An RE gas is a combustible gas which is obtained from renewable sources with the aid of electrical energy.

Hydrogen is a particularly environmentally friendly and sustainable energy carrier. It has the unique potential to implement energy systems, traffic and large parts of the chemical industry without $CO_2$ emissions. However, to achieve this, the hydrogen must not come from fossil sources, but rather must be produced with the aid of renewable energy. In the meantime, at least a growing proportion of the power produced from renewable sources has been fed into the public power grid. Therefore, according to the power mix, a corresponding proportion of green hydrogen can be produced if an electrolysis plant is operated with power from the public grid.

In the case of electrolysis processes carried out on an industrial scale, the direct current is predominantly provided via line-commutated rectifiers. During this rectification of a grid-side AC voltage, the method of operation of the rectifiers may result in harmonics which can load the AC grid and/or the DC grid.

EP 3 723 254 A1 discloses such an electrolysis plant that is connected to the public power grid and is accordingly fed with grid power. For this purpose, the electrolysis plant has a circuit arrangement comprising four coil arrangements and four rectifiers. The first coils of the coil arrangements are each connected to the DC voltage side of one of the rectifiers. The circuit arrangement also comprises two transformers, each having a primary winding and two secondary windings. The primary windings of the transformers are connected to the power grid, for example a medium-voltage grid or a high-voltage grid. This makes it possible to carry out desired smoothing of the direct current, or the attenuation of the harmonics, despite the reduced iron content within the first coil.

A source of renewable energies results from the increasing use of wind power. In particular, so-called offshore wind energy plants can be used to achieve high electrical powers. However, the challenge is that it is necessary to overcome a large distance to the consumers. The energy should therefore be transported to the consumer with as little loss as possible. Hydrogen is very suitable as a transport medium and energy carrier. It can be transported through pipelines in gaseous form, for example. A positive secondary aspect here is that a hydrogen-carrying pipeline can perform the function of an energy storage device at the same time since the internal pressure can be varied within certain limits.

From these considerations, it is of particular economic interest to produce the hydrogen directly at the energy production location, that is to say autonomously and independently of the public grid. For this purpose, it is proposed to install the electrolysis plants on offshore platforms in the maritime sector directly at offshore wind energy plants or in the immediate vicinity of the latter and to electrically supply them with the power produced.

Concepts for using the power from onshore wind power plants or photovoltaic plants to directly produce hydrogen at least partially by means of a direct connection to and feeding into an electrolysis plant have also been proposed for dry land. In all of these applications, the electrolysis plant is part of an island grid. The electrolysis current is therefore not obtained from the public grid, but rather is supplied directly by a wind energy plant or a PV plant and is fed into an electrolyzer of the electrolysis plant. In this case, the electrical energy produced by a wind energy plant or a PV plant may possibly be intermediately stored, for example in a battery. In contrast to the line-commutated operation described above, this respectively entails special challenges and problems in terms of the electrotechnical attachment and connection of the electrolysis plant to the respective RE production plant, whether a wind energy plant or a photovoltaic plant, in particular in order to ensure safe and, in particular, interference-free operation of the electrolysis plant in a direct plant network having the RE production plant.

In both line-commutated operation and island operation there is a great need for technical solutions for enabling reliable and at the same time cost-effective electrical connection of one or more electrolysis plants to the respective power generator. All the more since increasingly very large and complex electrolysis plants or electrolysis systems having a large number of electrolyzers need to be supplied with power at the same time and connected to an external power source accordingly. In this case, there are questions in particular relating to cost-effective power transmission from the respective power supply source to the electrolysis plants which are partly combined in a complex plant network in said combined plants.

SUMMARY OF THE INVENTION

The invention is therefore based on the object of specifying a plant network in which the most reliable and cost-effective possible electrical connection of electrolysis plants to a power supply source is achieved.

This object is achieved, according to the invention, by means of a plant network comprising at least two electrolysis plants, a power supply source and a central supply line, wherein the central supply line is connected to the secondary side of a transformer, into the primary side of which power can be fed from the power supply source, wherein the transformer is dimensioned for an operating frequency above the grid frequency of the public power grid, such that a higher-frequency AC grid is formed, to which the electrolysis plants are connected via the central supply line, and wherein the power supply source comprises a wind energy plant as power generator, to which a frequency converter is connected, the output of which is dimensioned for the operating frequency, wherein the output is connected to the primary side of the higher-frequency transformer, wherein the transformer is installed in the nacelle of the wind energy plant.

The invention is already based on the knowledge that there are connection questions and questions regarding efficient power transmission in the case of a combination of occasionally different external power supply sources with electrolysis plants to form a plant network. This applies both to island operation and to line-commutated operation when the electrolysis plants are connected to the public power grid. Depending on the distance between the electrolyzer of an electrolysis plant that is to be supplied with a direct current and the respective power supply source, the power transmission at a low voltage results in very high material costs, for example the electrical conductor used, in order to limit the transmission losses as far as possible. Especially in the case of a large physical distance, for example, if the generator in a wind energy plant is located high in the nacelle and the electrolysis plant is arranged at the base close to the tower or else at a great distance.

Purely for this simple example, simply a few 100 m of cable routing may have a considerable influence on the costs of supplying power to an electrolysis plant and connecting same to a power supply source. The routing and the associated material use alone result in a sizeable portion of the costs for the connection and power supply of the electrolysis plant. Expenditure for electrical apparatus for the connection and the transmission of the power is added to this.

On an industrial scale, for example, known solution approaches for reducing the power losses by reducing the current intensity and increasing the voltage are proposed. Transformers are often used to increase the transmission voltage. For this, said transformers require an AC voltage system, that is to say an AC grid, which is dimensioned for grid operation at a frequency of currently 50 Hz to 60 Hz. In actual fact, the transmission losses via the connection and supply lines are reduced by the transmission voltage that is selected to be greater. However, this configuration also has disadvantages since the transformers are accordingly large, heavy, and expensive.

In order to solve the connection and transmission problem in a plant network with a number of electrolysis plants as cost-effectively and efficiently as possible, the invention proposes connection via a higher-frequency AC grid set up for this purpose. The required transmission power is supplied from the power supply source to the electrolysis plants via the higher-frequency AC grid such that the electrolysis current is available. The operating frequency of the higher-frequency AC grid is specifically selected in this case to be above the grid frequency, for which purpose the transformer is dimensioned for an operating frequency above the grid frequency of the public grid of 50 Hz to 60 Hz. The power supply source feeds current via said HF transformer into the central supply line. The electrolysis plants in the plant network are each connected to the central supply line and draw the electrical power for the electrolysis process from the higher-frequency AC link. If required, multiple HF transformers dimensioned for the same operating frequency above the grid frequency may be provided in the AC link and accordingly connected to the central supply line.

This achieves very advantageous higher-frequency connection of an arbitrary number of electrolysis plants to the power supply source via the central supply line, where the central supply line acts as an AC bus line in the plant network. In addition to the ability to transmit the power with low losses, it is also advantageous that the size of the transformer can be selected to be smaller since the size or the installation space of the transformer decreases approximately linearly with the operating frequency. This can save in particular material costs for lines and transformers but also installation space for placing the transformer compared to conventional connections and dimensions for the available grid frequency. As a result, the transformer may for example be placed close to the power supply source or otherwise be structurally integrated into the plant network.

The power supply source comprises a wind energy plant as power generator, to which a frequency converter is connected, the output of which is dimensioned for the operating frequency, wherein the output is connected to the primary side of the higher-frequency transformer.

This achieves connection and power supply of the electrolysis plant to a wind energy plant in the plant network via the higher-frequency AC grid, where island grid operation is advantageously possible. If the plant network is operated in island operation, there is no connection to the public power grid. The grid frequency of the public power grid of 50 Hz to 60 Hz is thus insignificant for the dimensioning and the operation of the electrical components in the AC grid, for instance for the required conversion, transmission, or rectification. This achieves greater flexibility in the dimensioning and selection of the components, in particular for the selection of the operating frequency in the central supply line in the form of an AC bus in the AC link.

The invention additionally provides integration of the higher-frequency transformer within the nacelle of the wind power plant and particularly enables numerous cost advantages in construction and operating advantages of the plant network.

The weight and the size of the required transformer may advantageously be reduced as a result of the dimensioning and stipulation of a higher operating frequency. This reduces the material use especially with respect to iron and copper, as a result of which less installation space is also required. The installation of the high-frequency transformer in the nacelle of the wind energy plant is thus significantly simpler due to the reduction in weight and is possible in the limited installation space within a nacelle. At the same time, this positioning well protects the transformer within the nacelle and the transformer may advantageously be installed in the nacelle together with the frequency converter. In addition, the transformer and the higher-frequency AC link provide DC isolation that is very advantageous for the electrolysis process, which prevents or reduces in particular possible electrical stray currents in the plant components for process engineering in the electrolysis plant.

The concept with the central higher-frequency supply line is in this case easily scalable and very flexible with respect to the number of electrolysis plants supplied via the higher-frequency AC grid and the type of power supply source. The higher-frequency AC grid provides decoupling or independence with respect to the possible types of generation of the electrical power fed into the central supply line. The plant network may thus be dimensioned for island grid operation or else connection to a public grid is possible. Advantageous combinations and drawing from various power supply sources, such as from wind energy, photovoltaics, or hydroelectric power, are also possible.

In a particularly preferred configuration of the plant network, the electrolysis plants are connected in parallel with one another, wherein an electrolysis plant is connected to the central supply line via a respective connection line.

This fully shows the advantages of the AC bus principle with the central supply line that enables a respective independent connection line for an electrolysis plant and also provides same. In the plant network, the higher-frequency AC supply grid is able to be expanded flexibly as required and able to be extended by further electrolysis plants, possibly with adjustment of the infeed power from the power supply source.

In a preferred configuration, a connection transformer dimensioned for the operating frequency is connected into a connection line. When the connection line is connected to the central supply line, the AC grid is thus extended by a connection option and is dimensioned for operation at the operating frequency such that electrical AC power can be transmitted at the operating frequency from the central higher-frequency supply line to the connection line via the connection transformer. This power is available in the electrolysis plant connected via the connection line for other purposes in the electrolysis. In this case, a corresponding number of higher-frequency connection transformers may be provided depending on the application and on the number of connection lines and electrolysis plants to be supplied with power. For example, as a rule, a respective connection transformer will be provided in each connection line to couple electrical power out of the AC grid into the respective connection line. The dimensioning of the connection transformer may be flexibly adapted individually to the required output power in the respective connection line.

In a further preferred configuration, a rectifier, which is connected to the secondary side of the connection transformer, is provided in the connection line.

In this case, it is possible that an arbitrarily high number of higher-frequency connection transformers are advantageously provided in the higher-frequency AC grid constructed. In this case, a connection transformer may feed in each case into one or else into multiple rectifiers and thus supply power to the electrolysis plants. The secondary side is accordingly designed for multiple connection possibilities. The rectifier converts the higher-frequency alternating current from the AC grid that is coupled in on the input side to a direct current, so that the direct electrolysis current can be supplied on the output side via the connection line of the electrolyzers of the electrolysis plant. The rectifier may in this case also be considered part of the electrolysis plant in terms of circuitry and may be integrated therein, wherein the AC side of the rectifier is connected to the AC grid via a connection transformer.

An electrolyzer is preferably connected to the rectifier in the plant network. A supply of direct electrolysis current at the desired voltage level to an electrolyzer in an electrolysis plant is thus achieved. In this case, an electrolysis plant may also comprise multiple electrolyzers each having one electrolysis module or multiple electrolysis modules.

The power supply source preferably comprises a photovoltaic plant as power generator, to which an inverter is connected, the output of which is dimensioned for the operating frequency, wherein the output is connected to the primary side of a transformer dimensioned for an operating frequency above the grid frequency of the public power grid.

This configuration is additionally used to achieve in the plant network an advantageous connection and supply of power to the electrolysis plant with power obtained from a photovoltaic plant via the higher-frequency AC grid. In this case, island grid operation based on photovoltaics is also possible. In analogous consideration and in accordance with the advantages, as in the above-described connection of the electrolysis plant to a wind energy plant, operation that is independent of the public grid frequency is performed in an island grid, which enables particularly great design flexibility and autonomous use options aside from the public power grid. The grid frequency of the public power grid of 50 Hz to 60 Hz is thus irrelevant to the design and the operation of the electrical components in the AC grid, in this case to the required conversion of the direct PV current to an alternating current at the operating frequency, the infeed into the central supply line of the transmission or rectification. In relation to photovoltaics, the inverter can be used to produce directly on the output side an alternating current at the operating frequency that is able to be fed directly into the central supply line. The converter, that is to say the combination of rectifier and inverter, is thus omitted compared to the connection of a wind energy plant with AC generation at the generator. An appropriately designed inverter is sufficient.

In a further preferred configuration, the power supply source comprises a hydroelectric power plant with a generator as power generator, the output frequency of which is dimensioned for the operating frequency, wherein the generator is connected to the primary side of a transformer dimensioned for an operating frequency above the grid frequency of the public power grid.

A generator that already outputs a correspondingly higher frequency than the grid frequency directly at the output can advantageously be used in a hydroelectric power plant, that is to say the generator of the hydroelectric power plant is dimensioned for the operating frequency of the AC link. In comparison with a wind energy plant, it is thus possible to dispense with a DC link, which is required due to the interconnection of a rectifier and an inverter in the case of frequency conversion. This lower degree of complexity and number of components may result in additional cost advantages in the case of connection to a hydroelectric power plant, where island grid operation is also possible here. The output frequency of the generator results from the number of poles and the rotational speed. In particular, generators for hydroelectric power plants are therefore suitable for a higher-frequency connection and frequency-accurate coupling into the AC grid, because they are able to be adjusted well to the requirements in the case of application—at least within certain design limits.

In a preferred configuration, the power supply source comprises the public power grid, wherein a frequency converter is provided, the output of which is dimensioned for the operating frequency and is connected to the central supply line. In this case, it is also possible that the power generation source in the plant network is formed or fed from combinations of different power generators, such as a wind energy plant, photovoltaic plant or hydroelectric power plant.

The plant network is thus advantageously designed and configured for connection to the public power grid as required. Grid operation as well as island operation is thus possible. If there is to be a connection to the public power grid, it is thus possible and also preferable that the frequency converter is in the form of a central frequency converter, for example a central converter station, with appropriate performance capacity to save on components and to provide a central connection point for the withdrawal of grid power. This may be implemented, for example, in such a way that a rectifier and an inverter are provided in a combined circuit arrangement such that at the grid connection point initially the grid frequency is rectified by the rectifier and then converted to the higher-frequency operating frequency of the AC link. This type of central connection to the public power grid via a central frequency converter may be realized particularly easily at the grid connection point of a wind energy plant or a wind farm, for example.

In a preferred configuration, the transformer is in the form of a high-frequency transformer dimensioned for an operating frequency of greater than 80 Hz. A current at the operating frequency is thus able to be fed into the AC grid on the central supply line.

The plant network preferably comprises a higher-frequency AC grid dimensioned for an operating frequency of 80 Hz to 1000 Hz, in particular of 200 Hz to 500 Hz. The transformer is accordingly designed in each case to feed the alternating current at the operating frequency into the central supply line.

When selecting the operating frequency and the design of the components for the AC grid, it should be noted that the operating frequency that is selected is a frequency that ought not to be too high for efficient and low-loss transmission. Otherwise, the capacitive losses along the central supply line increase too significantly. The optimum frequency for the operating frequency therefore depends on the line length and line capacitance of the central supply line and is able to be adapted accordingly. The plant network should preferably be technically implemented most promisingly in an island grid application with generally limited distances and line routing of at most a few hundred meters, typically in the range of 50 m to 150 m. As a result, island grid operation that is independent of the public grid and direct use of power exclusively from renewable sources for the electrolysis is possible in the plant network, such that green hydrogen is formed.

A further, particularly preferred aspect relates to the use of a higher-frequency AC grid in the described plant network, wherein a number of electrolysis plants are connected to a central supply line, and wherein a higher-frequency alternating current is fed into the central supply line by a transformer installed in the nacelle of the wind energy plant.

In the use, a higher-frequency alternating current is provided by the transformer at an operating frequency above the grid frequency. The primary side of the transformer is supplied with power via the frequency converter of the AC generator of the wind energy plant as power supply source.

The weight and the size of the required transformer may advantageously be reduced as a result of the dimensioning and stipulation of a higher operating frequency. This reduces the material use especially with respect to iron and copper, as a result of which less installation space is also required. The installation of the high-frequency transformer in the nacelle of the wind energy plant is thus significantly simpler due to the reduction in weight and is possible in the limited installation space within a nacelle. In addition, the transformer and the higher-frequency AC link provide DC isolation that is very advantageous for the electrolysis process, which prevents or reduces in particular possible electrical stray currents in the plant components for process engineering in the electrolysis plant.

Advantages and advantageous configurations of the plant network of the invention are to be considered as advantages and advantageous configurations of the corresponding use and vice versa.

Further advantages, features and details of the invention emerge from the following description of preferred exemplary embodiments and on the basis of the drawing. The features and combinations of features mentioned above in the description and the features and combinations of features mentioned below in the description of the figures and/or shown in the single figures alone can be used not only in the respectively stated combination, but also in other combinations or alone, without departing from the scope of the invention.

Exemplary embodiments of the invention are explained in more detail on the basis of a drawing, in which, in a schematic and highly simplified manner:

The same reference signs have the same meaning in the figures.

DETAILED DESCRIPTION OF THE INVENTION

Figure 1:
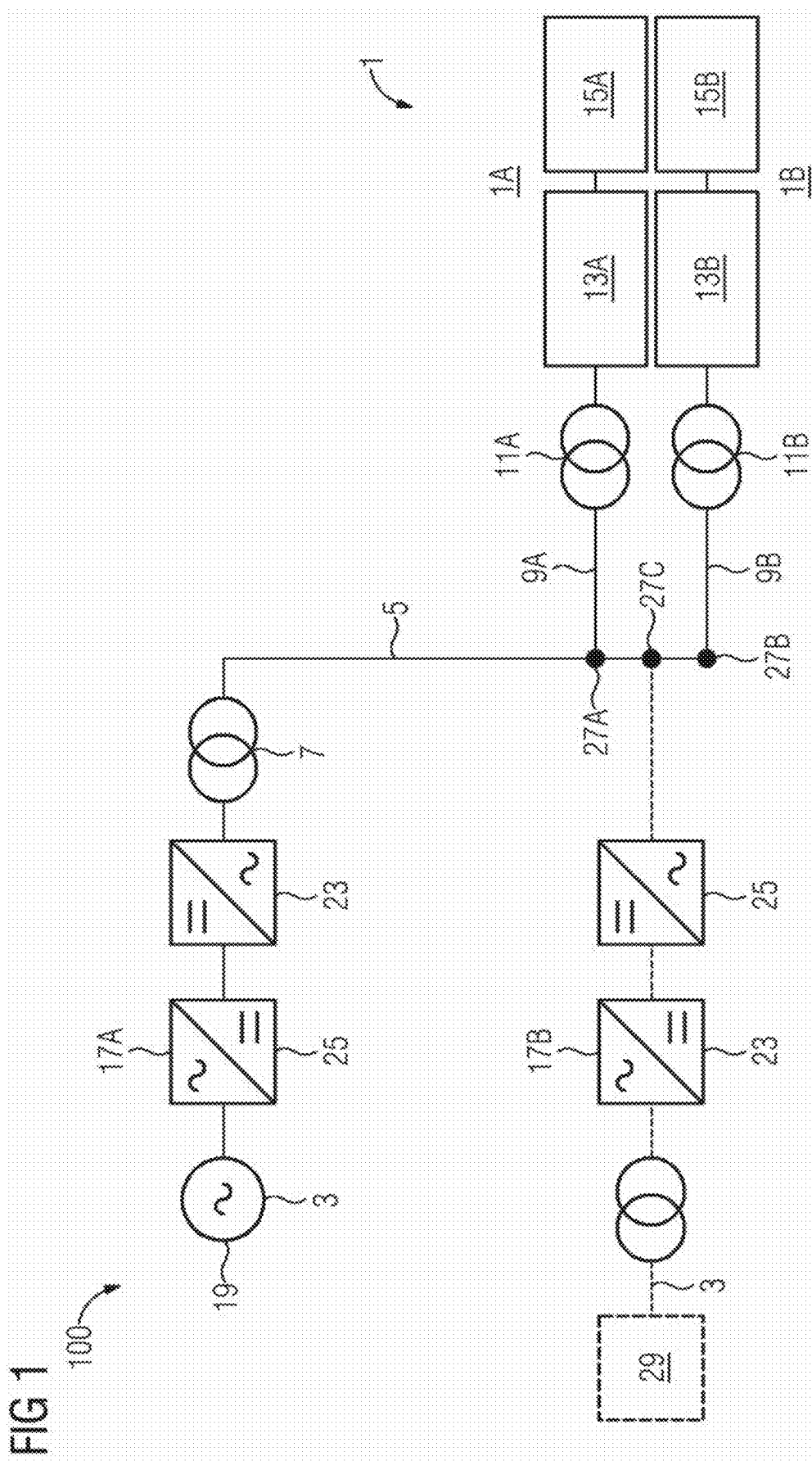
FIG. 1 shows a plant network having a higher-frequency connection to a wind energy plant.

FIG. 1 illustrates a plant network 100 according to the invention. The plant network 100 comprises an electrolysis system 1 comprising two electrolysis plants 1A, 1B and a power supply source 3 connected to the electrolysis system 1. The power supply source 3 has a wind energy plant 19 as power generator, which is used as a renewable energy plant (RE plant) and source for green power. The electrolysis system 1 is supplied with electrolysis current via a central supply line 5.

In this case, each of the electrolysis plants 1A, 1B of the electrolysis system 1 is connected to the central supply line 5 at a supply connection 27A, 27B via a respective connection line 9A, 9B such that a parallel connection of the electrolysis plants 1A, 1B is realized. In this case, the electrolysis plant 1A comprises at least one electrolyzer 15A and the electrolysis plant 1B comprises at least one electrolyzer 15B. The electrolyzers 15A, 15B may either be in the form of a PEM electrolyzer, an AEM electrolyzer (AEM: anion exchange membrane) or an alkaline electrolyzer, with combinations also being possible.

On the side with the power supply source 3, a frequency converter 17A is connected downstream of the output side of the wind energy plant 19 at a generator of the wind energy plant 19. The frequency converter 17A comprises a rectifier 25 and an inverter 23 connected downstream of the rectifier 25. An alternating current produced by the generator of the wind energy plant 19 can thus be converted to an alternating current of a higher frequency than the grid frequency and the higher-frequency alternating current can be fed into the central supply line 5. A transformer 7 is provided in the central supply line 5 to take up the power that is fed in, the current produced in the wind energy plant 19 being able to be fed or coupled into the primary side of the transformer via the inverter 23. The central supply line 5 is connected to the secondary side of the transformer 7. The operating frequency of the transformer 7 and the inverter 23 are dimensioned for a frequency above the grid frequency of the public power grid and matched one another so that the desired coupling-in and transmission of a higher-frequency alternating current are ensured. To this end, the transformer 7 is in the form of a high-frequency transformer (HF transformer)

and dimensioned, for example, for an operating frequency of greater than 80 Hz, for example between 200 Hz and 500 Hz. This interconnection forms and provides a higher-frequency AC grid, or an AC link, which comprises the central supply line 5. In this case, the central supply line 5 very advantageously acts as a central AC bus line, which enables a higher-frequency connection of an electrolysis system 1. The transformer 7 is arranged together with the generator and the frequency converter 17A within the nacelle of the wind energy plant 19 and is structurally integrated into the nacelle.

For a connection and power supply of the electrolysis plants 1A, 1B matched to the operating frequency, a connection transformer 11A is connected into the connection line 9A and accordingly a connection transformer 11B is connected into the connection line 9B. In this case, the primary side, that is to say the input of the connection transformer 11A, is connected to the central supply line 5 via a supply connection 27A and analogously the primary side of the connection transformer 27B is connected to said line via a supply connection 27B. The secondary sides of the connection transformers 27A, 27B are connected to the respective rectifier 13A, 13B so that a respective direct current is provided in the electrolyzers 15A, 15B for the electrolysis. During operation of the plant network 100, a higher-frequency AC grid is provided on the central supply line 5 and used to supply electrolysis current to the electrolysis plants 1A, 1B connected to the central supply line 5 in parallel. Through the use of a higher-frequency transformer 7, a higher-frequency alternating current can be provided and fed into the central supply line 5. In this case, the plant network can be designed and expanded flexibly by virtue of further electrolysis plants 1A, 1B being connected, for example. Grid-independent island grid operation is advantageously possible using the plant network 100.

However, as an alternative or in addition, a connection to the public power grid is also possible on the side with the power supply source 3. To this end, a supply connection 27C is provided in the central supply line 5, as illustrated in FIG. 1 by a dashed line. A frequency converter 17B comprising an inverter 23 and a rectifier 25 connected downstream of the inverter ensure conversion of the alternating current coupled out of the public power grid 29 at the grid frequency to the higher operating frequency. Therefore, if required, power from the public power grid 29 is also able to be fed into the central supply line 27C in a manner adapted to the frequency and is provided for use in the electrolysis system 1 for the purpose of electrolysis. It has proven to be advantageous here that the provision of a connection to the public power grid 29 covers a replacement demand, for example, for instance if the wind energy plant 23 is not producing power or is producing only a very limited power due to maintenance, or in phases of a Dunkelflaute (periods with very little sun or wind), such that a backup solution is available in order to ensure a power supply that is as continuous as possible and uniform operation of the electrolysis plant 1A, 1B for the production of hydrogen. Where necessary, one or more electrolysis plants 15A, 15B can be operated in partial load or be taken from the AC grid in the event of an undersupply of electrical AC power on the central supply line 5. Lastly, excess electrical energy that cannot be taken by the electrolyzers 15A, 15B can be fed into the public grid 29 via the grid connection 27C. In pure island grid operation, a replacement demand cannot generally be provided in the absence of an available connection to a public grid 29.

The concept of a higher-frequency AC grid that is provided via the central supply line 5 thus provides a higher-frequency AC link in the plant network 100, by way of which link advantageous DC decoupling is also realized. The inverter 23 is connected to the primary side of the transformer 7. A respective rectifier 13A, 13B is connected to the secondary side of the transformer 7 in the connection line 9A, 9B. The electrolyzers 15A, 15B are supplied with a direct current, the electrolysis current, via the rectifiers 13A, 13B. The electrolysis plant 1A, 1B are DC-isolated via the respective connection transformer 11A, 11B in the corresponding connection line 9A, 9B, which reduces disadvantageous stray currents in the process engineering of the electrolysis.

Figure 2:
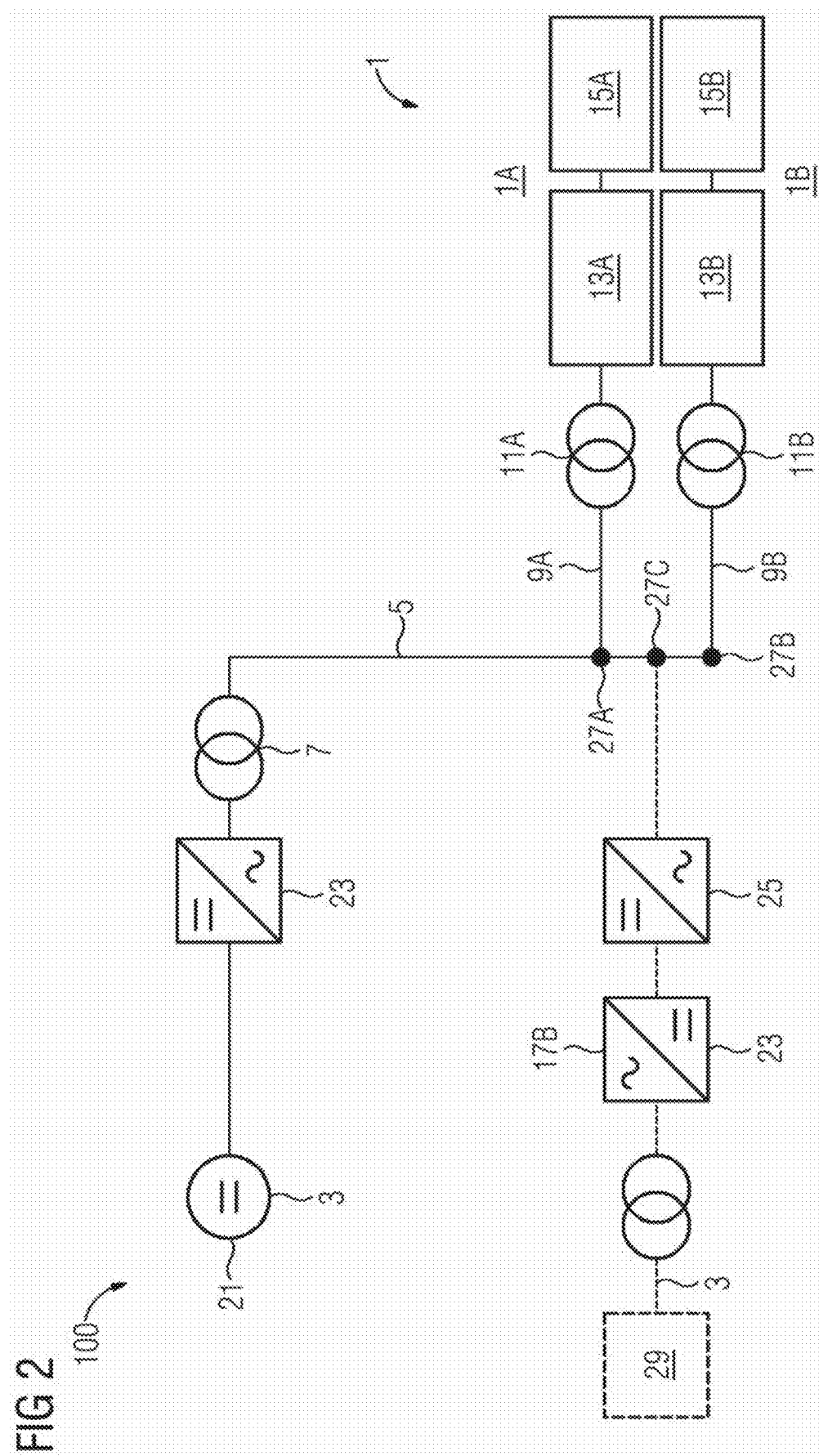
FIG. 2 shows a plant network having a high-frequency connection to a photovoltaic plant.
Figure 3:
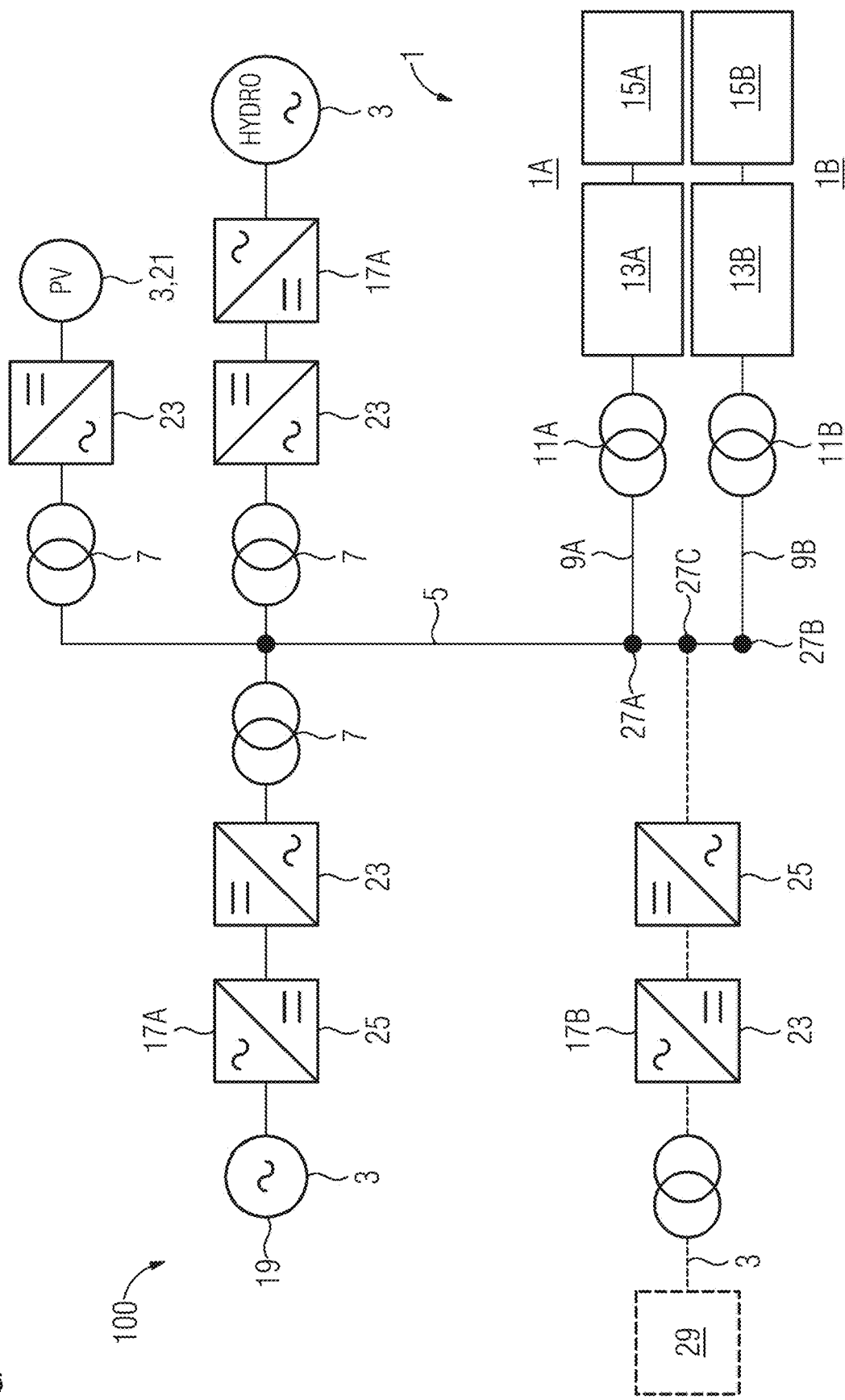

In a further exemplary embodiment of a plant network 100 according to the invention, FIG. 2 shows an alternative power supply source 3 for supplying direct current to the electrolysis system 1. In this case, the power supply source 3 comprises a photovoltaic plant 21, comprising a multiplicity of PV modules, which are not illustrated in more detail. The photovoltaic plant 21 may for example be in the form of an extensive and high-performance open-area plant-preferably in sunny regions-so that PV power of 10 MW of electrical power and beyond is available for the electrolysis. On the part of the electrolysis system 1, a fully analogous plant concept and corresponding plant components is applied as in FIG. 1, that is to say the electrical connection and power supply of the electrolysis plants 1A, 1B is carried out via the central supply line 5. In order to achieve this the electrolysis plant 1A is electrically connected to the supply connection 27A and accordingly the electrolysis plant 1B is connected to the supply connection 27B.

In order to arrive at a desired and advantageous AC voltage level for the infeed into the central supply line 5 with respect to the photovoltaic plant 21, an inverter 23 is connected at the DC output of the photovoltaic plant 21 in the example of FIG. 2. The inverter 23 is dimensioned for the operating frequency and provides the higher-frequency AC voltage at the output. The power of the photovoltaic plant 21 is coupled and fed into the central supply line 5 via the transformer 7. For the transmission and drawing of the electrical power by the electrolysis system 1, the electrolysis plants 1A, 1B—as described above in more detail—are connected to the central supply line 5 via a respective connection line 9A, 9B. In addition, advantageous DC decoupling is achieved by the connection transformers 11A, 11B. Feeding grid power from the public power grid 23 into the central supply line 5 is also possible for the PV application in an analogous configuration to that described with respect to FIG. 1. It is also possible to feed power from the photovoltaic plant 21 into the public power grid via the central supply line 5.

The invention specifies a plant network 100 using which an electrical power in particular from a renewable power supply source 3 is able to be fed into an electrolysis system 1 comprising a number of electrolysis plants 1A, 1B, such that 100% green hydrogen is able to be produced in the electrolyzers 15A, 15B. This very advantageously takes place in the described plant network 100 comprising at least two electrolysis plants 1A, 1B, a power supply source 3 and the central supply line 5 that is in the form of a central AC bus line and provides an alternating current at an operating frequency above the grid frequency of the public grid. A higher-frequency AC grid is thus provided and used in the plant network 100, wherein a number of electrolysis plants 1A, 1B are connected to a central supply line 5 and operated, wherein a higher-frequency alternating current is fed into the central supply line 5. In a particularly simple application, in one application of a plant network 100, it is also alternatively possible that only one electrolysis plant 1A, 1B is electrically connected to the central supply line 5 and is accordingly able to be supplied and operated with electrolysis current. The system or the plant network 100 is thus able to be extended in a modular manner as required or else able to be reduced and adjusted flexibly to a respective number of electrolysis plants 1A, 1B. The central supply line 5 that forms a central AC grid can accordingly be dimensioned to the AC grid power or output power of the electrolysis plants 1A, 1B that are to be supplied with power. The number of electrolysis plants 1A, 1B is in this case not limited in principle and is determined by the infeed power into the central AC grid and the output power of the electrolysis plant 1A, 1B.

The invention claimed is:

1. A plant network, comprising:
   at least two electrolysis plants;
   a power supply source having a wind energy plant as power generator;
   a transformer installed in a nacelle of the wind energy plant, said transformer having a primary side configured to receive power from said power supply source;
   a central supply line connected to a secondary side of said transformer;
   said transformer being dimensioned for an operating frequency above a grid frequency of a public power grid, to form a higher-frequency AC grid to which said at least two electrolysis plants are connected via said central supply line;
   a frequency converter connected to said power supply source and being dimensioned for the operating frequency above the grid frequency of the public power grid; and
   said frequency converter having an output connected to the primary side of said transformer.

2. The plant network according to claim 1, wherein said at least two electrolysis plants are connected in parallel with one another, and wherein each electrolysis plant is connected to said central supply line via a respective connection line.

3. The plant network according to claim 2, which comprises a connection transformer dimensioned for the operating frequency and connected into a respective said connection line.

4. The plant network according to claim 3, further comprising a rectifier connected to a secondary side of said connection transformer in said connection line.

5. The plant network according to claim 4, which comprises an electrolyzer connected to said rectifier.

6. The plant network according to claim 1, wherein said power supply source comprises a photovoltaic plant as power generator, and wherein an inverter with an output dimensioned for the operating frequency is connected to said photovoltaic plant and an output of said inverter is connected to a primary side of a transformer that is dimensioned for the operating frequency above the grid frequency of the public power grid.

7. The plant network according to claim 1, wherein said power supply source comprises a hydroelectric power plant with a generator as power generator, wherein said generator has an output frequency dimensioned for the operating frequency, and wherein said generator is connected to the primary side of said transformer that dimensioned for an operating frequency above the grid frequency of the public power grid.

8. The plant network according to claim 1, wherein said power supply source comprises the public power grid, and wherein a frequency converter is provided with an output dimensioned for the operating frequency and said frequency converter is connected to said central supply line.

9. The plant network according to claim 1, wherein said transformer is a high-frequency transformer dimensioned for an operating frequency above 80 Hz.

10. The plant network according to claim 1, wherein the higher-frequency AC grid is dimensioned for an operating frequency of between 80 Hz and 1000 Hz.

11. The plant network according to claim 10, wherein the higher-frequency AC grid is dimensioned for an operating frequency of between 200 Hz and 500 Hz.

12. A method of using a higher-frequency AC grid in a plant network, the method comprising:
    providing a plant network according to claim 1 having at least two electrolysis plants connected to a central supply line; and
    feeding a higher-frequency alternating current into the central supply line.

13. The method according to claim 12, wherein the higher-frequency alternating current is provided by a transformer which is installed in a nacelle of a wind energy plant and which has an operating frequency above the grid frequency of the public power grid.

* * * * *